United States Patent
Lee et al.

(10) Patent No.: US 9,544,908 B2
(45) Date of Patent: Jan. 10, 2017

(54) METHOD FOR CHANNEL MANAGEMENT AND DATA TRANSMISSION IN WIRELESS SENSOR NETWORK

(71) Applicant: Electronics and Telecommunications Research Institute, Daejeon (KR)

(72) Inventors: Jun Hee Lee, Daejeon (KR); Wun-Cheol Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/445,596

(22) Filed: Jul. 29, 2014

(65) Prior Publication Data

US 2015/0036620 A1 Feb. 5, 2015

(30) Foreign Application Priority Data

Jul. 31, 2013 (KR) ........................ 10-2013-0091111

(51) Int. Cl.
*H04W 4/00* (2009.01)
*H04W 72/08* (2009.01)
*H04W 84/18* (2009.01)

(52) U.S. Cl.
CPC ........... *H04W 72/082* (2013.01); *H04W 84/18* (2013.01)

(58) Field of Classification Search
CPC .................... H04W 72/082; H04W 84/18
See application file for complete search history.

(56) References Cited

U.S. PATENT DOCUMENTS

| | | | | |
|---|---|---|---|---|
| 5,452,471 A * | 9/1995 | Leopold | ............. | H04B 7/18563 455/12.1 |
| 5,862,130 A * | 1/1999 | Tat | ............. | H04J 4/00 370/330 |
| 8,565,683 B2 | 10/2013 | Lee et al. | | |
| 2009/0257396 A1* | 10/2009 | Eliezer | ............. | H04B 1/036 370/330 |
| 2011/0038343 A1* | 2/2011 | Bhatti | ............. | H04W 28/06 370/330 |
| 2011/0151793 A1* | 6/2011 | Lee | ............. | H04W 72/085 455/63.1 |
| 2012/0069869 A1* | 3/2012 | Jeong | ............. | H04L 12/40013 375/132 |
| 2013/0194944 A1* | 8/2013 | Soyak | ............. | H04W 16/14 370/252 |

FOREIGN PATENT DOCUMENTS

| | | |
|---|---|---|
| KR | 10-2011-0070702 A | 6/2011 |
| KR | 10-2012-0045339 A | 5/2012 |

* cited by examiner

*Primary Examiner* — Clemence Han
(74) *Attorney, Agent, or Firm* — Rabin & Berdo, P.C.

(57) ABSTRACT

A method for dynamically managing wireless channels to minimize channel interference between heterogeneous wireless devices, and transmitting data by effectively using channels, is provided. Interference between heterogeneous wireless networks is avoided in a channel hopping mode, whereby a data transmission success rate of the wireless sensor network is enhanced, thus enhancing reliability of data transmission.

11 Claims, 7 Drawing Sheets

| NODE 1 | | NODE 2 | | NODE 3 | |
|---|---|---|---|---|---|
| CHANNEL | STATE | CHANNEL | STATE | CHANNEL | STATE |
| 11 | 0 | 11 | 1 | 11 | 0 |
| 12 | 0 | 12 | 0 | 12 | 0 |
| 13 | 0 | 13 | 0 | 13 | 0 |
| 14 | 1 | 14 | 0 | 14 | 0 |
| 15 | 0 | 15 | 0 | 15 | 0 |
| 16 | 0 | 16 | 1 | 16 | 0 |
| 17 | 0 | 17 | 1 | 17 | 0 |
| 18 | 0 | 18 | 0 | 18 | 1 |
| 19 | 0 | 19 | 0 | 19 | 1 |
| 20 | 0 | 20 | 0 | 20 | 0 |
| 21 | 0 | 21 | 0 | 21 | 0 |
| 22 | 0 | 22 | 0 | 22 | 0 |
| 23 | 0 | 23 | 0 | 23 | 0 |
| 24 | 1 | 24 | 0 | 24 | 0 |
| 25 | 0 | 25 | 0 | 25 | 0 |
| 26 | 0 | 26 | 0 | 26 | 1 |

FIG. 2
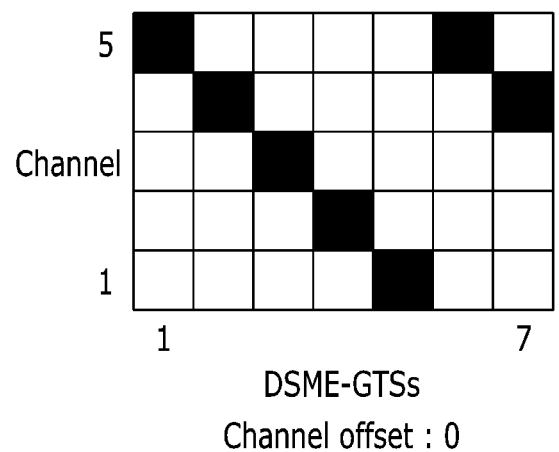
(A)
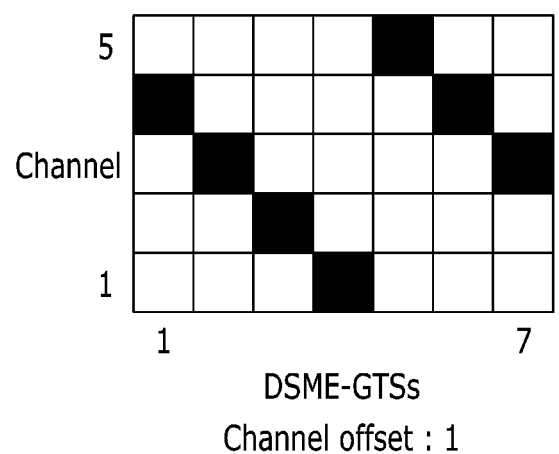
(B)

| NODE 1 | | NODE 2 | | NODE 3 | |
|---|---|---|---|---|---|
| CHANNEL | STATE | CHANNEL | STATE | CHANNEL | STATE |
| 11 | 0 | 11 | 1 | 11 | 0 |
| 12 | 0 | 12 | 0 | 12 | 0 |
| 13 | 0 | 13 | 0 | 13 | 0 |
| 14 | 1 | 14 | 0 | 14 | 0 |
| 15 | 0 | 15 | 0 | 15 | 0 |
| 16 | 0 | 16 | 1 | 16 | 0 |
| 17 | 0 | 17 | 1 | 17 | 0 |
| 18 | 0 | 18 | 0 | 18 | 1 |
| 19 | 0 | 19 | 0 | 19 | 1 |
| 20 | 0 | 20 | 0 | 20 | 0 |
| 21 | 0 | 21 | 0 | 21 | 0 |
| 22 | 0 | 22 | 0 | 22 | 0 |
| 23 | 0 | 23 | 0 | 23 | 0 |
| 24 | 1 | 24 | 0 | 24 | 0 |
| 25 | 0 | 25 | 0 | 25 | 0 |
| 26 | 0 | 26 | 0 | 26 | 1 |

FIG. 5

| Octets : 2 | 1 | 1 | variable | 1 | variable | 2 |
|---|---|---|---|---|---|---|
| Frame Control | Sequence Number | Channel Usage Bitmap Length | Channel Usage Bitmap | Black Channel Count Length | Black Channel Count | FCS |
| MHR | | | | | | MFR |

METHOD FOR CHANNEL MANAGEMENT AND DATA TRANSMISSION IN WIRELESS SENSOR NETWORK

CROSS-REFERENCE TO RELATED APPLICATION

This application claims priority to and the benefit of Korean Patent Application No. 10-2013-0091111 filed in the Korean Intellectual Property Office on Jul. 31, 2013, the entire contents of which are incorporated herein by reference.

BACKGROUND OF THE INVENTION (a) Field of the Invention

The present invention relates to a method for channel management and data transmission to effectively cope with channel interference in a wireless sensor network system using time division-based channel hopping media access control (MAC).

(b) Description of the Related Art

Recently, a wireless sensor network system, which is reliable and meets low-latency demand, has been required in industrial sites. In order to meet the low-latency demand, a wireless sensor network system should have the following characteristics. First, in order to enhance reliability, multiple channels should be used to solve channel interference and collision. Second, in order to resolve a phenomenon in which data transmission is delayed between terminating nodes, a time division channel acquiring method, rather than a contention-based channel obtaining method, should be used.

In addition, in order to guarantee reliability in a multi-channel and time division channel acquiring method, the wireless sensor network system should be able to cope with channel interference that may occur in a heterogeneous wireless device included in a wireless sensor network.

However, a degree of interference of a wireless interference signal may be dynamically changed according to data traffic and a physical communication environment, making it difficult to effectively cope with channel interference between heterogeneous wireless devices.

SUMMARY OF THE INVENTION

The present invention has been made in an effort to provide a method for dynamically managing wireless channels to minimize channel interference between heterogeneous wireless devices, and transmitting data by effectively using channels.

An exemplary embodiment of the present invention provides a method for managing a channel of a reception node included in a wireless sensor network.

The channel managing method includes: when a data frame is not received in at least one of a plurality of channels used in the wireless sensor network, counting the number of times of not receiving a data frame; when the number of times of not receiving a data frame from a first transmission node through a first channel among a plurality of channels is n, changing a state of the first channel into an unavailable state; and informing the first transmission node about the unavailable state of the first channel through a second channel among the plurality of channels.

In the channel managing method, the changing of a state of the first channel into unavailable state may include: changing a state of the first channel in a channel table stored in a reception node; and generating an unavailable channel bitmap through the channel table.

In the channel managing method, the informing of the first transmission node about the unavailable state of the first channel may include: after a state of the first channel is changed into an unavailable state, receiving a data frame from the first transmission node through the second channel; and informing the first transmission node about the unavailable state of the first channel by using an ACK frame with respect to the received data frame.

In the channel managing method, the informing about the unavailable state of the first channel by using an ACK frame may include: including an unavailable channel bitmap and a black channel count value indicating a time at which the unavailable state of the first channel is to be initialized in an ACK frame; and transmitting the ACK frame to the first transmission node.

In the channel managing method, after the changing of a state of the first channel into the unavailable state, when a pre-set time has lapsed, counting according to a black channel count value indicating a time at which the unavailable state of the first channel is to be initialized.

In the channel managing method, the black channel count value may be indicated by a guaranteed time slot (GTS) of the data frame.

The channel managing method may further include: after the counting, when a data frame is received through the second channel different from the first channel among the plurality of channels from a second transmission node that shares the first channel with the first transmission node, informing the second transmission node about the unavailable state of the first channel by using an ACK frame with respect to the received data frame.

In the channel managing method, the informing of the second transmission node about the unavailable state of the first channel may include: including an unavailable channel bitmap and a black channel count value in the ACK frame; and transmitting the ACK frame to the second node.

The channel managing method may further include: after the counting, when a data frame is received through the first channel from a transmission node, other than the first transmission node, before the counting is finished, changing a state of the first channel into an available state; and informing the first transmission node and the second transmission node about the available state of the first channel.

The channel managing method may further include: after the counting, when a data frame is not received through the first channel before the counting is finished, changing a state of the first channel into an available state after the counting is finished.

The channel managing method may further include initializing black channel counting, after the changing of the state of the first channel into an available state.

Another embodiment of the present invention provides a method for transmitting data by a transmission node included in a wireless sensor network. The data transmission method includes: determining a channel hopping sequence in consideration of a band size of a single channel used in a different wireless network using a frequency band the same as that of the wireless sensor network; receiving a bitmap indicating a state of a plurality of channels used in the wireless sensor network; and transmitting data through a channel indicated as an available state in the bitmap according to the channel hopping sequence.

In the data transmission method, the channel hopping sequence may be determined such that when a band size of a single channel used in the different wireless network corresponds to a band size of n number of channels used in the wireless sensor network, an interval between channels to be allocated to two adjacent time slots is equal to or greater than an interval of the n number of channels.

In the data transmission method, the channel hopping sequence may be received from a coordinator included in the wireless sensor network.

In the data transmission method, the channel hopping sequence may be received from a node of a higher layer of a transmission node when the wireless sensor network has a hierarchical structure.

In the data transmission method, the receiving of the bitmap may include, when a state of at least one of a plurality of channels is indicated as an unavailable state in the bitmap, receiving a black channel count value indicating a time at which the unavailable state of the unavailable channel is to be initialized.

In the data transmission method, the transmitting of data may include not transmitting data through the unavailable channel in spite of the channel hopping sequence during black channel counting according to the black channel count value.

BRIEF DESCRIPTION OF THE DRAWINGS

In FIGS. 2, (A) and (B) are views illustrating channel hopping sequences implemented in a wireless sensor network.

FIG. 5 is a view illustrating an ACK frame according to an embodiment of the present invention.

DETAILED DESCRIPTION OF THE EMBODIMENTS

Figure 1:
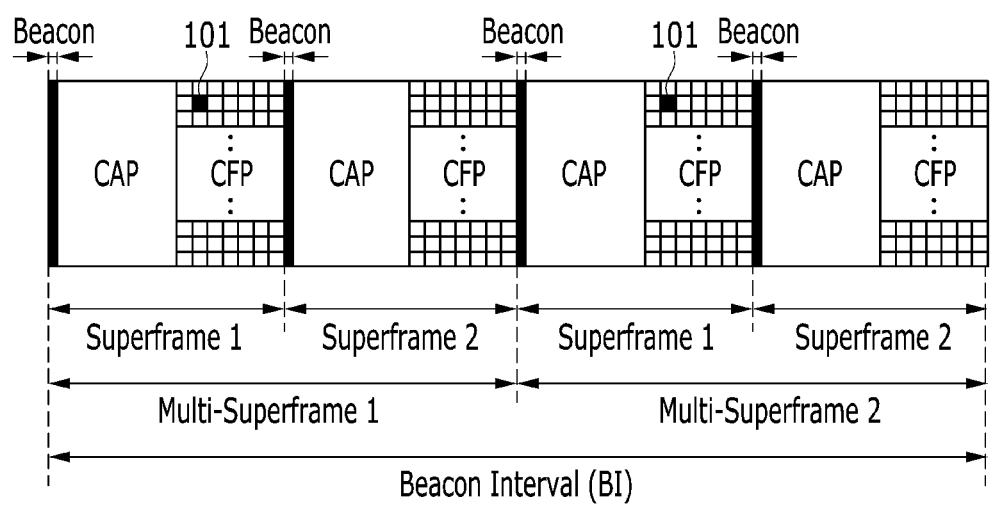
FIG. 1 is a view illustrating multi-superframes of a wireless sensor network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms such as "-er", "-or", and "module" described in the specification mean units for processing at least one function and operation and can be implemented by hardware components or software components and combinations thereof.

FIG. 1 is a view illustrating multi-superframes of a wireless sensor network.

In applying a wireless sensor network to application services such as factory automation, process monitoring, and the like, in industrial sites, IEEE 802.15.4e standardized a media access control (MAC) standard to guarantee reliability of wireless sensor networks and support low latency.

A distributed synchronous multichannel extension (DSME) MAC protocol of IEEE 802.15.4e uses multi-superframes obtained by extending a superframe in a, IEEE 802.15.4 beacon mode in order to guarantee reliability of low-latency real-time transmission. A multi-superframe includes a plurality of superframes. A single superframe includes a period for broadcasting a beacon for network time synchronization, a contention access period (CAP) (or a contention-based channel access period), and a contention-free period (CFP) (or a reservation-based time division channel access period). A length of a frame used in the DSME MAC protocol is defined by a beacon interval. Here, during a beacon interval, a plurality of multi-superframes may be transmitted.

The CAP is a section for a plurality of nodes to access a common channel by using a CSMA/CA protocol as a random channel access scheme. The CFP, including a plurality of time slots based on multiple channels, is a section to access a channel by reserving a time slot for communication between nodes (or inter-node communication).

For inter-node communication using the CFP, one or more of a plurality of time slots included in a multi-superframe should be reserved. Here, when a plurality of multi-superframes are included in a beacon interval, inter-node communication using the CFP follows content reserved in a preceding multiframe. In FIG. 1, a black portion 101 in the lattice representing a CFP indicates a time slot reserved for inter-node communication.

Meanwhile, in the CFP of a multi-superframe, reliability of wireless communication can be enhanced through channel diversity using multiple channels. A channel hopping scheme is a type of channel diversity supported in the DSME MAC, whereby channels may be moved on by a given hopping sequence and channel offset value. In case of using the channel hopping scheme, a plurality of nodes may have authority to access different channels during the same period of time, preventing channel interference.

In FIGS. 2, (A) and (B) are views illustrating channel hopping sequences implemented in a wireless sensor network.

Referring to FIG. 2, two adjacent nodes may transmit data according to a hopping sequence as illustrated in (A) and (B).

A hopping sequence refers to an aggregation of available channels arranged in a particular order. Channel hopping refers to a method of transmitting data by moving a channel to a next channel according to order defined in the hopping sequence each time a single time slot has lapsed.

In the respective channel hoping sequences illustrated in (A) and (B) of FIG. 2, sequences are the same but channel offsets are different. Thus, two adjacent nodes may transmit data by using different channels in the same time slot.

The channel hopping scheme using the multiple channels as illustrated in FIG. 2 provides a method allowing a node to access a channel according to a given hopping sequence and channel offset regardless of a wireless channel environment.

However, a channel management technique flexibly coping with an interference signal when wireless devices using different standards such as Bluetooth, Wi-Fi, and the like share resources of the 2.4 GHz frequency band is required. As a technique complementing the problem of the DSME MAC channel hopping scheme, an adaptive interference avoidance technique based on channel hopping of an ad-hoc network has been proposed. It is a technique for preventing degradation of channel quality due to selective frequency fading or an interference signal from a heterogeneous wireless device.

In the adaptive interference avoidance technique of an ad-hoc network, each node measures channel quality by using an LQI of a data frame transmitted from a transceiver, includes an unavailable channel list in a beacon data or an acknowledge (ACK) frame, and transfers the same to a neighbor node. Thereafter, the neighbor node does not use a channel having poor quality with reference to the received channel information, thus preventing an unnecessary frame transmission attempt.

However, with the adaptive interference avoidance technique, it is difficult to manage channel resource of each link and reflect changed content of channel information in a transmitted channel list.

In an embodiment of the present invention, a hoping sequence capable of avoiding interference with a different wireless network is provided.

Figure 3:
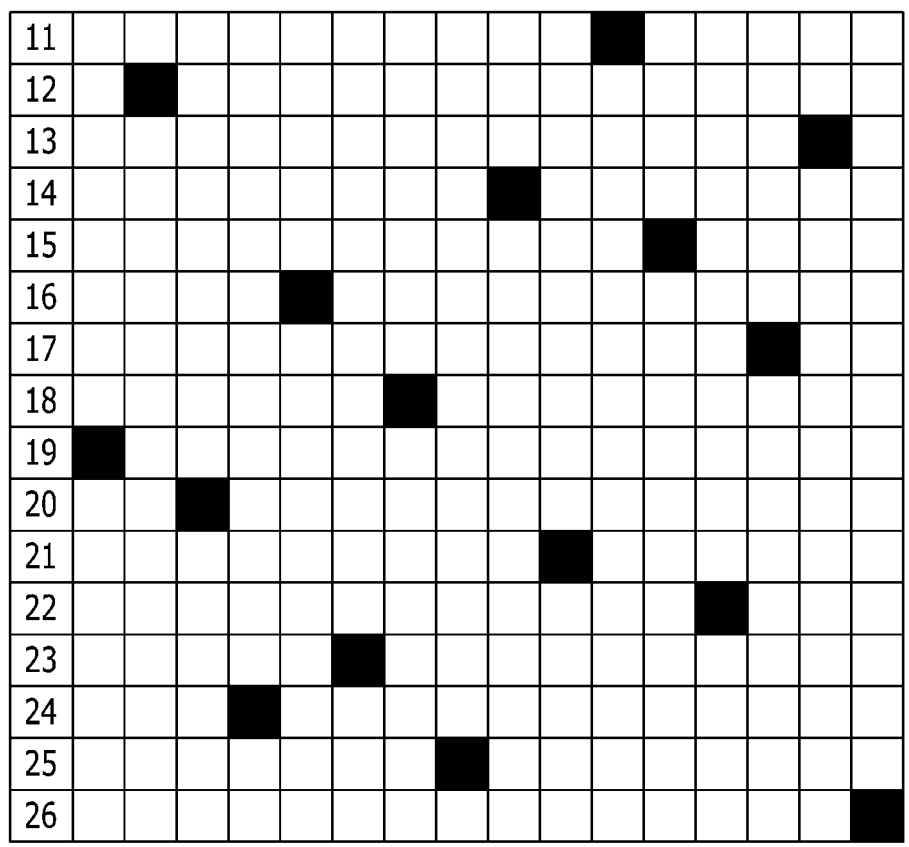
FIG. 3 is a view illustrating a hopping sequence according to an embodiment of the present invention.

FIG. 3 is a view illustrating a hopping sequence according to an embodiment of the present invention.

For example, a wireless sensor network supports a total of sixteen channels in a 2.4 GHz frequency band, and a size of a band of a single channel of Wi-Fi using the same frequency band as that of the wireless sensor network corresponds to a size of bands of four channels of the wireless sensor network. Thus, in generating a hopping sequence of a time slot, a channel interval of an adjacent time slot should be four channels or more. In this manner, by determining a hopping sequence, an adjacent time slot may not be interfered with by a Wi-Fi network.

That is, in a case in which there is a wireless network using a frequency band overlapping with a frequency band used in the wireless sensor network, a hopping sequence of the wireless sensor network may be determined in consideration of a size of a band of a single channel of the wireless network. For example, even industrial, science, and medical (ISM) bands and wireless local area networks (WLAN) use the 2.4 GHz frequency band, so, according to an embodiment of the present invention, a hopping sequence of the wireless sensor network may be determined in consideration of a size of a band of a single channel of the ISM bands, the WLAN, or the like.

Channels of adjacent time slots may be assorted by an interval of four channels or more. For example, a channel hopping sequence as illustrated in FIG. 3 is {19, 12, 20, 24, 16, 23, 18, 25, 14, 21, 11, 15, 22, 17, 13, 26}.

The foregoing hopping sequence may be generated in a personal area network (PAN) coordinator of the wireless sensor network and transmitted to a node which has newly entered the network. Alternatively, in a case in which the wireless sensor network is configured hierarchically, the node which has newly entered the network may receive a hopping sequence from a node of a higher layer.

Figure 4:
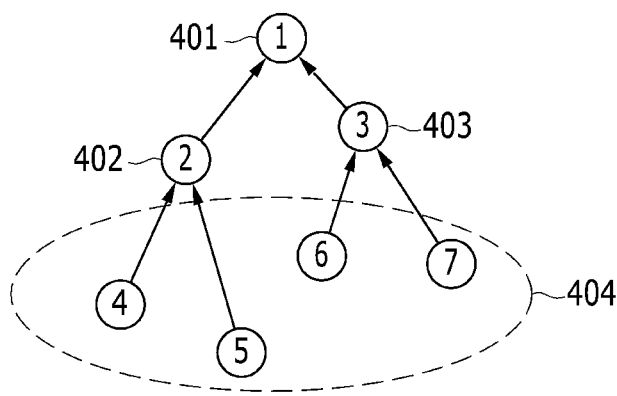
FIG. 4 is a view illustrating a network and unavailable channel table according to an embodiment of the present invention.

FIG. 4 is a view illustrating a network and unavailable channel table according to an embodiment of the present invention.

In the network according to an embodiment of the present invention, the respective nodes 401 to 404 included in the network are allocated a time slot for data transmission by using a command frame. Each node stores a resource allocation state by links through the received command frame.

Here, the node which has received the command frame determines channel quality, and when data is not received from a particular channel n times consecutively, the node regards the channel as an unavailable channel.

The unavailable channel table illustrated in FIG. 4 serves to manage unavailable channels on the basis of the channel quality determination results measured by the respective reception nodes 401 to 403. Each of the reception nodes generates an unavailable channel table by combining links, rather than generating an unavailable channel table for each link, for management of a memory. That is, the nodes according to an embodiment of the present invention may manage the channel quality determination results obtained from the links through the integrated unavailable channel table.

Referring to FIG. 4, the node 2 402 and the node 3 403 transmit a data frame in a time slot reserved for the node 1 401. Here, when the node 2 402 and the node 3 403 transmits a data frame by using channel #14 and channel #24, if the node 1 401 fails to receive the data frame n times consecutively, the node 1 401 changes a state of the channel #14 and the channel #24 into 1. That is, when a particular channel is an unavailable channel, a state there of is indicated as "1", and when a particular channel is not an unavailable channel, a state thereof is indicated as "0".

Meanwhile, since the node 2 402 fails to receive a data frame n times consecutively through the channel #11, channel #16, and channel #17 from a node 4 and a node 5, it changes states of the channels #11, #16, and #17 into 1 in the unavailable channel table. Also, the node 3 403 fails to receive a data frame n times consecutively through the channel #18, channel #19, and channel #26 from a node 6 and a node 7, it changes states of the channels #18, #19, and #26 into 1 in the unavailable channel table.

That is, the unavailable channel table of the node 1 401 illustrated in FIG. 4 is based on data frames received by the node 1 401. Like the node 1, when a data frame is not received from a particular channel n times consecutively, the node 2 402 and the node 3 403 change a state of the channel into "1" and update the unavailable channel table.

After updating the unavailable channel table in the foregoing manner, each node includes the updated unavailable channel table in an ACK frame and transmits the same to a node which has transmitted a data frame. In this case, the unavailable channel table may be included in a bitmap form in the ACK frame.

When the ACK frame is received, the node performs channel hopping with reference to a timer field included in the ACK frame, thus transmitting a data frame. Here, information included in the timer field may be information indicating how long the node that transmits a data frame should apply an unavailable channel bitmap. According to an embodiment of the present invention, each node may appropriately update channel available information of a wireless environment that constantly changes, through the timer field.

FIG. 5 is a view illustrating an ACK frame according to an embodiment of the present invention.

The ACK frame according to an embodiment of the present invention includes an unavailable channel information bitmap and a timer field. The unavailable channel information bitmap may express an available or unavailable state of a channel by a bitmap. For example, if channel #3 and channel #15, among sixteen channels, are unavailable, the unavailable channel information bitmap will be "0010000000000010".

The timer field includes a black channel count field indicating timer information and a length field.

The timer information included in the black channel count field indicates a time at which the node which has received the ACK frame should initialize unavailable channel information. That is, the node which has received the ACK frame initializes unavailable channel information when a duration from a point in time at which the ACK frame was received to a time (e.g., it may be indicated by a guaranteed time slot (GTS) unit) written in the black channel count field has lapsed.

For example, when an unavailable channel bitmap of the ACK frame is "0000000000100000" and the black channel count field is 16, the node which has received the ACK frame changes a channel #21 into an unavailable channel during sixteen GTS intervals, and when the sixteen GTS intervals have passed, the node initializes bitmap information of the channel #21 to "0".

A size of the black channel count field may be determined according to the number of unavailable channels, and the length field indicates a length of the black channel count field. For example, when a black channel count (corresponding to a single unavailable channel) is k bits and there are m number of unavailable channels, a length of the black channel count field may amount to k*m bits.

Figure 6:
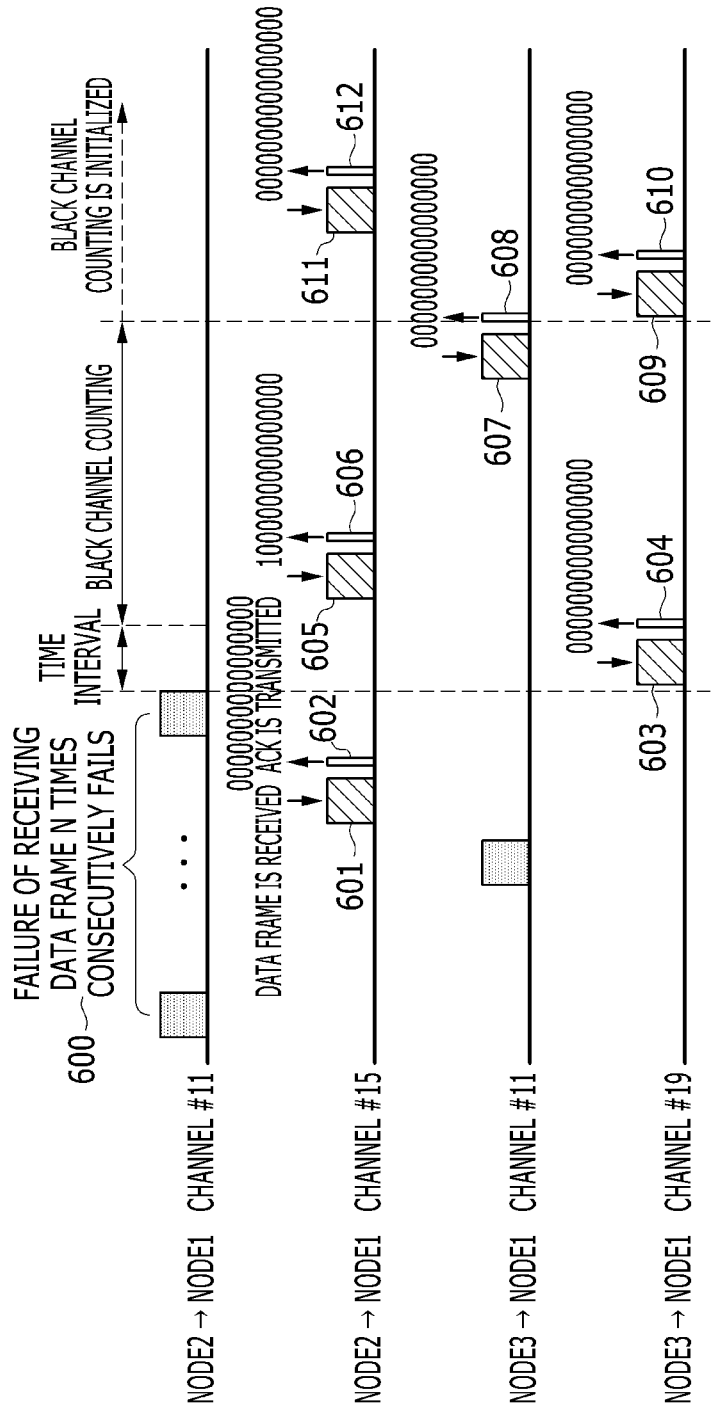
FIG. 6 is a view illustrating frames transmitted and received in a reception node of a network according to an embodiment of the present invention.

FIG. 6 is a view illustrating frames transmitted and received in a reception node of a network according to an embodiment of the present invention.

Referring to FIG. 6, node #1 as a reception node receives data frames by using channels #11, #15, and #19, and transmits ACK frames with respect to the received data frames. The node 1 receives data frames from the node 2 by using channels #11 and #15, and transmits ACK frames with respect to the data frames received through the respective channels to the node 2. Also, the node 1 receives data frames from the node 3 by using channels #11 and #19, and transmits ACK frames with respect to the data frames received through the respective channels to the node 3.

First, the node 2 has transmitted a data frame to the node 1 by using the channel #11, but the node 1 fails to receive a data frame from the node 2 during n times of time slots consecutively (600).

Thus, although the node 1 may not receive data frames from all the neighbor nodes including the node 3 through the channel #11 for a while, it may receive data frames 601, 605, and 611 from the node 2 through the channel #15 and transmit ACK frames 602, 606, and 612, and receive data frames 603 and 607 from the node #3 through the channel #19 and transmit ACK frames 604 and 608.

Thereafter, the node 1 changes a state of the channel #11 into an unavailable state. For example, the node 1 changes an item with respect to the channel #11 into "1" in the unavailable channel table.

Thereafter, when the node 1 transfers an ACK frame with respect to a next data frame transmitted from the node 2, the node 1 includes an unavailable channel bitmap (1000000000000000) in which the state of the channel #11 has been changed, in the ACK frame, and transfers the same to the node 2.

That is, in the case in which the node 1 receives the data frame 605 from the node 2 through the channel #15, when the node 1 transmits the ACK frame 606, the node 1 includes the unavailable channel bitmap (1000000000000000) in which the state of the channel #11 has been changed in the ACK frame 606.

In this case, the unavailable channel information in which the state of the channel #11 has been changed into an unavailable state should be shared by all the nodes connected to the node 1, but the node 1 does not immediately start to count black channels. After the state of the channel #11 is changed into an unavailable state, if the node 1 immediately starts black channel counting and subsequently includes an unavailable channel bitmap in an ACK frame with respect to a data frame received through a different channel and transmits the same to a different node, nodes other than the node 2 would immediately know the unavailable state of the channel #11. In this case, although the state of the channel #11 is changed later, the channel #11 remains unused until black channel counting reaches 0, which is ineffective in terms of channel usage.

Thus, in an embodiment of the present invention, the node 1 starts black channel counting after the lapse of a predetermined time interval. When the node 1 receives a data frame from a node that shares the channel #11 with the node 2 through a channel other than the channel #11 before it starts black channel counting, the node 1 includes an unavailable channel bitmap in which the state of the channel #11 has not been changed, in an ACK frame, and transfers the ACK frame.

Referring to FIG. 6, an unavailable channel bit map included in the ACK frame 602 transmitted by the node 1 through the channel #15 before the failure of reception of a data frame n times consecutively from the channel #11 is "0000000000000000". However, an unavailable channel bit map included in the ACK frame 606 transmitted by the node 1 through the channel #15 after the failure of reception a data frame n times consecutively is "1000000000000000". Thus, the node 2 recognize the unavailable channel bitmap in the ACK frame 606 received from the node 1, and does not use the channel #11 when transmitting a data frame to the node 1.

Referring to FIG. 6, before the node 1 starts black channel counting, it includes the unavailable channel bitmap (0000000000000000) in an unavailable channel in which a state of the channel #11 remains unchanged, in the ACK frame 604 with respect to the data frame 603 which has been received from the node 3, and transfers the ACK frame 604.

That is, since the node 3 is connected to the node 1 through the channel #19 besides channel #11, the node 1 includes an unavailable channel bitmap in which a state of the channel #11 remains unchanged in the ACK frame 604 with respect to a data frame which has been received from the node 3, in the ACK frame 604, and transfers the ACK frame 604 to the node 3.

Thereafter, when a predetermined period of time has lapsed, the node 1 starts black channel counting.

Before the black channel counting is finished (before predetermined GTSs are not passed), when the node 1 receives a data frame through the channel #11 from a different node that shares the channel #11, rather than from the node 2, the node 1 changes a state of the channel #11 into an available state and initializes black channel counting. Then, the node 1 include an unavailable channel bitmap in which the state of the channel #11 has been changed into an available state, in the ACK frame with respect to the received data frame, and transmits the ACK frame to the node 3.

Referring to FIG. 6, before the black channel counting is finished, when the node 1 receives the data frame 607 from the node 3 through the channel #11, the node 1 changes a state of the channel #11 into an available state and initializes black channel counting. The node 1 then includes the unavailable channel bitmap in which the state of the channel

11 has been changed into an available state in the ACK frame 608, and transmits the ACK frame 608 to the node 3.

Thereafter, the node 1 may receive the data frame 609 from the node 3 through the channel #19 and receive the data frame 611 from the node 2 through the channel #15. Since the unavailable state of the channel #11 has been terminated, the node 1 includes the unavailable channel bitmap (0000000000000000) in which the state of the channel #11 has been changed into an available state in the ACK frames 610 and 612 with respect to the received data frames 609 and 611, and transmits the ACK frames 610 and 612 to the node 2.

Meanwhile, the node 1 may not receive a data frame from a different node through the channel #11 until black channel counting is finished. In this case, the node 1 may receive a data frame from a node other than the node 2 through a channel other than the channel #11, include the unavailable channel bitmap (1000000000000000) and remaining black channel count in an ACK frame, and transmit the same. Thereafter, when black channel counting is finished, the node 1 may change the state of the channel #11 into an available state and initialize the black channel counting.

Figure 7:
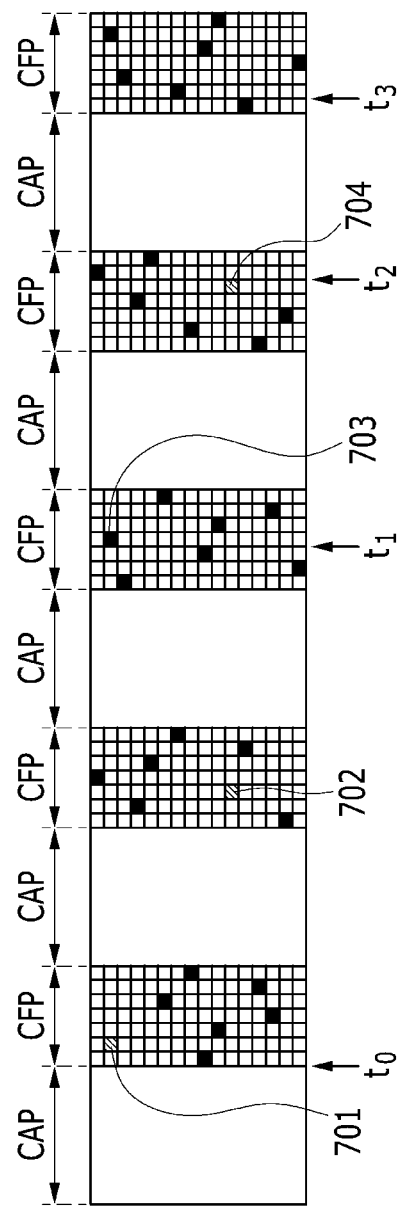
FIG. 7 is a view illustrating a data frame of a transmission node according to an embodiment of the present invention.

FIG. 7 is a view illustrating a data frame of a transmission node according to an embodiment of the present invention.

Referring to FIG. 7, a data frame according to an embodiment of the present invention includes a CAP and a CFP. A lattice filled with a black color indicates a reserved time slot, and a lattice filled with oblique lines indicates a time slot of an unavailable channel.

In an embodiment of the present invention, the channel hopping sequence of a transmission node is {19, 12, 20, 24, 16, 23, 18, 25, 14, 21, 11, 15, 22, 17, 13, 26}.

First, a transmission node receives bitmap information "0100000000100000" from a reception node, and recognizes a black channel count value of respective unavailable channels (channels #12 and 21). In an embodiment of the present invention, a black channel count value of the channel #12 is 17, and that of the channel #21 is 29.

The transmission node counts a black channel count value by time slots of the CFP. Thus, when the $17^{th}$ time slot included in the CFP of FIG. 7 ends, data may be transmitted in the channel #12, and when the $29^{th}$ time slot ends, data may be transmitted in the channel #21.

Referring to FIG. 7, the transmission node counts a black channel count value from a first CFP $t_0$. According to a predetermined channel hopping sequence, data is to be transmitted through the channel #12 (701) in the second time slot and through the channel #21 (702) in the $10^{th}$ time slot, but since black channel counting is not yet finished, data is not transmitted.

Thereafter, black channel counting with respect to the channel #12 is terminated at a point in time $t_1$ at which the $17^{th}$ time slot of the data frame ends, and data is transmitted through the channel #12 in the $18^{th}$ time slot.

Thereafter, data is to be transmitted through the channel #21 (704) according to the channel hopping sequence in $26^{th}$ time slot $t_2$, but since black channel counting of the channel #21 is not yet terminated, data is not transmitted.

Finally, when the $29^{th}$ time slot ends $t_3$, data may be transmitted through the channel #21 (not shown) in the $42^{nd}$ time slot.

In this manner, when a channel resource is managed dynamically according to an embodiment of the present invention, communication failure that may be caused due to channel interference when operating the wireless sensor mode in a channel hopping mode can be avoided. Also, even when a state of a particular channel deteriorates and thus is prevented from being used, it may be used again after the lapse of a predetermined time through dynamic channel resource management. Thus, according to an embodiment of the present invention, reliability can be enhanced by enhancing a data transmission success rate of the wireless sensor network, and since energy consumption of a node due to frame retransmission is minimized, the lifespan of a node can be lengthened.

In addition, according to an embodiment of the present invention, interference between heterogeneous wireless networks is avoided in a channel hopping mode, whereby a data transmission success rate of the wireless sensor network is enhanced, thus enhancing reliability of data transmission.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for managing channel of a reception node included in a wireless sensor network, the method comprising:

when a data frame is not received in at least one of a plurality of channels used in the wireless sensor network, counting the number of times of not receiving a data frame;

when the number of times of not receiving a data frame from a first transmission node through a first channel among a plurality of channels is n, changing a state of the first channel into an unavailable state; and informing the first transmission node about the unavailable state of the first channel through a second channel among the plurality of channels;

wherein the changing of the state of the first channel into the unavailable state comprises:

changing the state of the first channel in a channel table stored in the reception node; and generating an unavailable channel bitmap through the channel table; and wherein the informing of the first transmission node about the unavailable state of the first channel comprises:

after the state of the first channel is changed into the unavailable state, receiving a data frame from the first transmission node through the second channel; and informing the first transmission node about the unavailable state of the first channel by using an ACK frame with respect to the received data frame.

2. The method of claim 1, wherein the informing about the unavailable state of the first channel by using the ACK frame comprises including a black channel count value indicating a time at which the unavailable state of the first channel is to be initialized and the unavailable channel bitmap in the ACK frame and transmitting the ACK frame to the first transmission node.

3. The method of claim 2, wherein the black channel count value is indicated by a guaranteed time slot (GTS) of the data frame.

4. The method of claim 1, wherein after the changing of the state of the first channel into the unavailable state,
> when a pre-determined time has lapsed, counting according to a black channel count value indicating a time at which the unavailable state of the first channel is to be initialized.

5. The method of claim 4, wherein the black channel count value is indicated by a guaranteed time slot (GTS) of the data frame.

6. The method of claim 4, further comprising,
after the counting,
> when a data frame is received through the second channel different from the first channel among the plurality of channels from a second transmission node that shares the first channel with the first transmission node, informing the second transmission node about the unavailable state of the first channel by using an ACK frame with respect to the received data frame.

7. The method of claim 6, wherein the informing of the second transmission node about the unavailable state of the first channel comprises
> including the unavailable channel bitmap and the black channel count value in the ACK frame and transmitting the ACK frame to the second node.

8. The method of claim 6, further comprising,
after the counting:
when a data frame is received through the first channel from a transmission node, other than the first transmission node, before the counting is finished, changing the state of the first channel into an available state; and
informing the first transmission node and the second transmission node about the available state of the first channel.

9. The method of claim 6, further comprising,
after the counting,
when a data frame is not received through the first channel before the counting is finished, changing a state of the first channel into an available state after the counting is finished.

10. The method of claim 8, further comprising
initializing black channel counting, after the changing of the state of the first channel into an available state.

11. The method of claim 9, further comprising
initializing black channel counting, after the changing of the state of the first channel into an available state.

* * * * *